(No Model.)

R. W. ROLLINS.
ELECTRIC LIGHTING SYSTEM.

No. 492,633. Patented Feb. 28, 1893.

Witnesses:
Frank G. Waterhouse
Albert E. Chappell

Inventor:
Robert W. Rollins

UNITED STATES PATENT OFFICE.

ROBERT W. ROLLINS, OF HARTFORD, CONNECTICUT.

ELECTRIC-LIGHTING SYSTEM.

SPECIFICATION forming part of Letters Patent No. 492,633, dated February 28, 1893.

Application filed August 16, 1892. Serial No. 443,191. (No model.)

*To all whom it may concern:*

Be it known that I, ROBERT W. ROLLINS, a citizen of the United States, residing at the city of Hartford, in the State of Connecticut, have invented new and useful Improvements in Systems of Electrical Distribution, of which the following is a specification.

The object of my invention is to provide a system of electrical transmission in which two or more independent circuits, each having a separate constant current dynamo electric machine can be united together in pairs by means of a single conductor, which will form a path for the current of both circuits in the same direction or a path for either current while the current in the other circuit is broken.

My invention also embraces means for throwing either one of a pair of dynamo-electric machines in or out of circuit in order to prevent one machine from interfering or reversing the polarity of the other.

The nature of my invention consists in connecting two or more dynamo electric machines in pairs so that each machine will have a separate circuit and the current in each separate circuit will unite in a single conductor in the same direction in a way that will enable one machine of a pair to be actively generating a current on its respective circuit without magnetizing or reversing the poles of the other machine belonging to the same pair when it is inactive or not producing a current.

The advantage of my invention is that it enables the energy of two or more independent sources of electric power to be transmitted to work placed upon each separate circuit by means of a single return conductor, or by means of separate conductors leading from separate dynamo electric machines which form the working circuits and which unite in a single conductor capable of returning the current from both circuits back to their original source.

In order to successfully carry my invention into practice, certain means are employed which consists of instruments placed upon the separate circuits which prevent the current in an active circuit from magnetizing or reversing the field poles of the other machine belonging to the other circuits when not in action.

Figure 1:
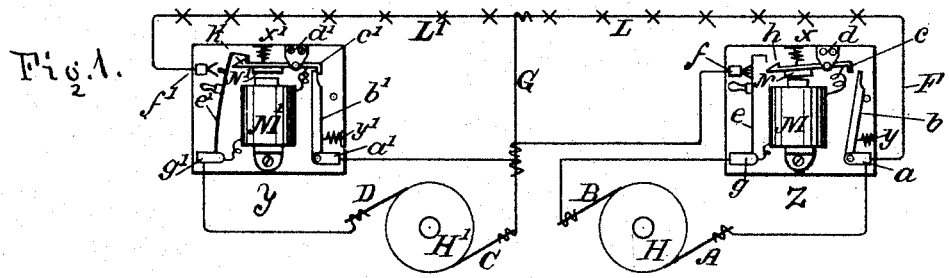
Figure 2:
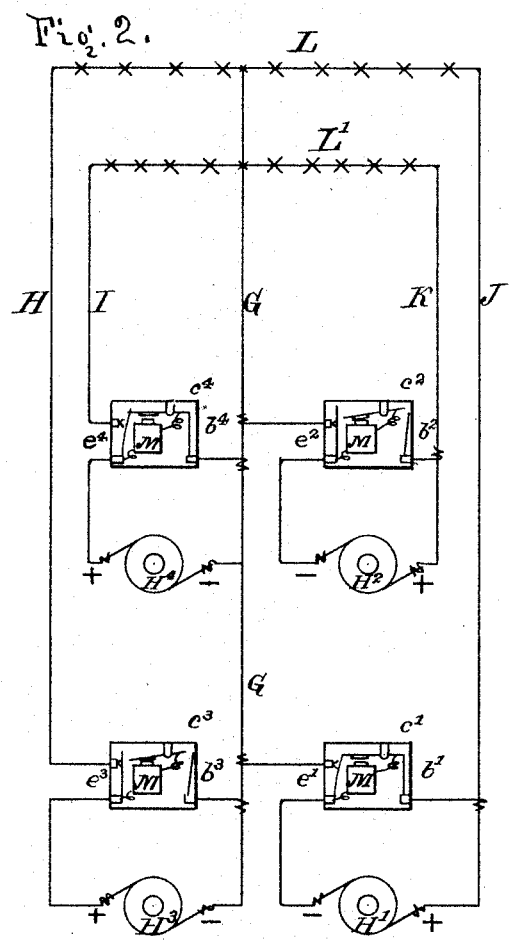

In order to explain the nature of my invention, I will refer to the accompanying drawings, in which Figure 1, shows two separate dynamo electric machines, having two independent circuits joined by means of a single return wire. Fig. 2, shows four separate dynamo electric machines, each having an independent circuit, all of said circuits being joined by a single return conductor.

In Fig. 1, is shown what represents two high electro motive force constant current dynamo electric machines H and H', each having a working circuit of its own. Machine H having the circuit upon which the lamps L are placed and the lamps L' belong to the circuit of machine H', these two circuits unite in wire G, which carries the currents back to brushes B and C, which went to the work from brushes A and D. On the circuit of each machine is an automatic cut-out switch, which can be set so that each machine will be short circuited within itself and be cut out from its own working circuit when such machine is inactive or not generating a current, and so that it will cut itself into its working circuit as soon as the machine is started or begins to produce a current.

The duties of these cut-out devices are to enable the machines to be worked on two independent circuits having a common return wire so that as one machine is inactive, it will be cut out of its own circuit in order to prevent the current from the other active machine from affecting its proper magnetic relations or reverse its poles so as to cause both machines to work in series which would be objectionable and dangerous from the fact that each machine is supposed to have an electro motive force as high as the safe limit will permit when their current is so directed as to have a common return wire, but which would exceed the safe limit in case the polarity of either machine of a pair should be reversed, and it is to prevent the possibility of one machine reversing the current of the other that these cut-out devices become a necessary part of my invention.

Fig. 1 shows two of these cut-out devices, one in each of the circuits which use the common return wire G. These cut-outs, Y and Z, consist of boards upon which are placed terminals $a$, $f$, and $g$, to which wires are connected, each having an electro-magnet M, which acts upon a tilting armature $x$, one end of this armature hooks on to an upright switch arm $b'$ (see cut-out Y), while the other end of $x$ hooks on to a spring $e$, which leads from terminal $g'$ and holds the spring $e'$ from terminal $f'$ by means of an insulated hook $h'$, so that in this case, the current starting in machine H' from brush D would pass to terminal $g'$ then through the coil forming the magnet M' to the tilting lever $x$, then to the upright arm $b'$, which is held by the hooked end of lever $x$, then down arm $b'$ to terminal $a'$, then out on wire from $a'$ to the return wire G and back to the machine on brush C. It will be seen that in this position, the spring $e'$ is held from the terminal $f'$, which leaves the working circuit upon which the lamps L' are placed open, so that no current can pass from machine H and reverse the polarity of machine H', while at the same time the machine H' is close circuited as stated. Now, when the machine H' starts and a local circuit is formed of sufficient strength to energize its field magnets in the right direction and resist the opposing current from the other machine H, then this local current in passing through magnet M' of cut-out Y attracts the tilting armature $x$, which unhooks the upright arm $b'$ and also the spring $e'$, which operation causes $e'$ to snap against the terminal $f'$ and complete or close the working circuit, and at the same time break the local or short circuit which passed through magnet M', by allowing the arm $b'$ to fall away from the hooked end C' of the armature lever $x$; this brings the cut-out Y in the same shape as shown by the cut-out Z, which results in completing the two working circuits for each machine, having a common return wire G, the circuit belonging to machine H being from brush A on wire to terminal $a$, of cut-out Z, then out on the working circuit to the lamps L, then back on wire G, and out on wire to terminal $f$, down on spring $e$, to terminal $g$, then back on wire to brush B, while the circuit of machine H' is out on brush D to terminal $g'$, then upon spring $e'$ to terminal $f'$ with which the spring $e'$ is now supposed to be in contact, then out from terminal $f'$ to the lamps L' and back on wire G to the contact brush C.

Fig. 2 shows that more than one pair of dynamo-electric machines, with independent working circuits may be combined so as to use a common return wire, each machine having a cut-out device substantially as above described, in its own working circuit. In this case, machine H' and H³, with their respective cut-out boards $c'$ and $c^3$, combine in working the two sets of lamps shown on line L, while the two currents return to these machines on line G, and at the same time the machines H² and H⁴, with their respective cut-out boards $c^2$ and $c^4$ operate the two circuits which run the lights on line L', while the currents on these two circuits unite and return to their respective machines on the same line G as that which conducted the other currents.

What I claim as my invention is—

1. A system of electrical distribution, consisting or two or more independent working circuits, with translating devices placed thereon in series, each circuit having an independent source of electrical energy and cut-out devices adapted for open circuiting any working circuit when its respective source of energy is inactive and having means for causing the electrical energy belonging to any particular circuit to automatically close such circuit, substantially as and for the purposes set forth.

2. A system of electrical distribution, consisting of two or more dynamo-electric machines placed upon independent working circuits, the current in each circuit uniting in a single conductor and passing through said conductor in the same direction with cut-out devices placed in each independent circuit adapted for preventing the dynamo-electric machine belonging to each independent circuit from changing its polarity or having its polarity changed by the action of the other sources of electrical energy, substantially as and for the purposes set forth.

3. In a system of electrical distribution, consisting of independent working circuits which unite in a single conductor, worked by separate dynamo-electric machines, the combination of cut-out devices adapted for short circuiting, each dynamo, while it is inactive, and at the same time breaking its working circuit, said cut-out having means for automatically breaking the short circuit around each machine, and at the same time closing its working circuit as soon as such dynamo begins to generate a current, substantially as and for the purposes set forth.

ROBERT W. ROLLINS.

Witnesses:
FRANK G. WATERHOUSE,
LESTER H. COLTON.